United States Patent [19]

Cantamessa

[11] Patent Number: 4,513,954
[45] Date of Patent: Apr. 30, 1985

[54] DAMPING CORE ARTICULATED JOINT FOR MECHANICAL ARTICULATED ARM SYSTEMS SUBJECT TO VIBRATIONS

[75] Inventor: Lorenzo Cantamessa, Solto Collina, Italy

[73] Assignee: DAMP S.p.A., Sovere, Italy

[21] Appl. No.: 446,637

[22] Filed: Dec. 3, 1982

[30] Foreign Application Priority Data

Jul. 1, 1982 [IT] Italy .................................. 2923 A/82

[51] Int. Cl.³ .............................................. F16F 15/08
[52] U.S. Cl. ...................................... 267/141.3; 16/2; 403/71; 403/194
[58] Field of Search ............................ 16/2, 108, 109; 267/136, 57.1 R, 141.1–141.5, 153, 154; 403/71, 403/194, 197, 199, 201

[56] References Cited

U.S. PATENT DOCUMENTS 3,520,554 7/1970 Ravenel .......................... 267/57.1 R
3,685,772 8/1972 Giaccone ............................ 267/153

FOREIGN PATENT DOCUMENTS 47-45989 11/1972 Japan .................................. 267/153

Primary Examiner—Duane A. Reger

[57] ABSTRACT

Damping core articulated joint for mechanical articulated arm systems subject to vibrations, in which the articulation of the articulated joint is passed through by a hole of cross-section other than circular, comprising an elastomer ring core passed through by a through hole of cross-section other than circular, the core outside having a central annular band of planar pattern, to which two annular ridges are connected as diverging from opposite sides relative to the central band, and a tubular insert also of not circular cross-section, inserted in the through hole of the ring core and made of a stiffer material than that of the elastomer.

8 Claims, 5 Drawing Figures

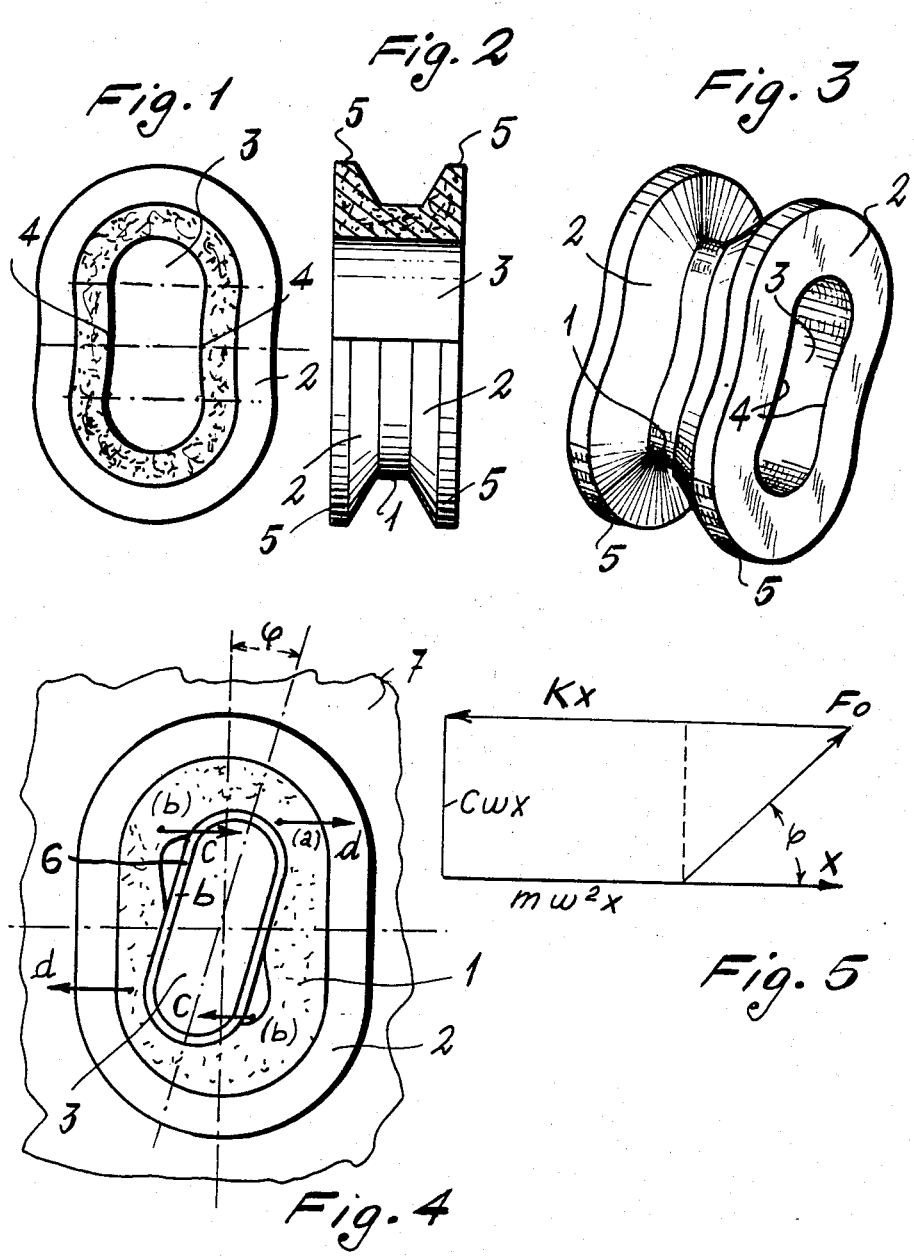

DAMPING CORE ARTICULATED JOINT FOR MECHANICAL ARTICULATED ARM SYSTEMS SUBJECT TO VIBRATIONS

This invention relates to a damping core articulated joint for mechanical articulated arm systems subject to vibrations, such as suspensions, shock absorbers, shock absorbers-spacers and the like, wherein the damping core is provided to be so shaped as to give a much lower resilient recovery force than the active force causing the initial movement or displacement.

It is well known that to provide a high dissipating rate for vibrations in such systems as those above referred to, the phase angle between the force imparted to the articulated joint and the displacement being produced should be sufficiently large. Elastomers have hysteresis values allowing to provide a given value for said phase angle, particularly causing such elastomers to operate under compression. While compression operating elastomers have a hysteresis value of some significance, not always the phase displacement values between the imparted force and displacement are of sufficient value or magnitude to assure an effective vibration damping.

Particularly, it often occurs to dispose of articulated joints having rubber damping cores which while tending on one to deform under the action of vibrations, have on the other hand upon release of the applied force a ready elastic or spring reaction, or an immediate recovery, thus creating a continuous hunting between the vibration absorption phase and the position recovery phase of the damping core, with the fully adverse result that sometimes the vibrations are not only correctly damped, but further induced oscillations are quite developed.

It is the object of the present invention to provide a damping core articulated joint having a high value of phase angle and in which the elastic recovery force is much lower than the active force causing the initial displacement.

According to the invention this is accomplished by a damping core articulated joint for the above cited purposes, characterized by comprising a body member formed of an elastomer ring core having a through hole passing therethrough of cross-section other than circular, the core outside having a central annular band of planar pattern, to which connected are two annular ridges diverging from opposite sides relative to the central band, as well as a tubular insert also of not circular cross-section, arranged within the through hole of the ring core and made of a stiffer material than that of the elastomer.

As above mentioned, it is an advantage of the implementation according to the invention to allow an artificial increase in the value of the phase angle and accordingly in the value of the damping force.

Another advantage of the articulated joint having a core according to the invention is that, as the elastic recovery force is lower than the active force causing the initial displacement, the return or recovery phase does not completely occur without application of a reduced amount of force for moving the oscillating element back to the initial position, thus further considerably increasing the damping effect.

The invention will now be further described in an embodiment thereof given by way of unrestrictive example, to be considered in connection with the accompanying drawings, in which:

FIGS. 1, 2 and 3 are views respectively showing a cross-section, a longitudinal section and a perspective view of the core according to the invention;

FIG. 4 is a cross-sectional view showing the behaviour of the damping core arranged in an articulated joint; and FIG. 5 is a vectorial diagram showing the pattern of the damping force viz the phase angle.

Reference will be first made to FIG. 5 for better showing the significance of the value of the phase angle between the force given to the articulated joint and displacement being derived thereby.

There is shown in FIG. 5 the vectorial relationship of forces in a forced vibration with viscous damping. The following relations are valid in this figure:

$Kx$ = force of the element acting as a spring
$m\omega^2 x$ = inertial force
$c\omega x$ = damping force
$Fo$ = imparted force
$x$ = displacement
$\rho$ = phase angle between imparted force and displacement.

From this diagram it clearly appears that any decrease in the phase angle would result in a decrease of $c\omega x$, that is in a decrease of the damping force, which would tend to zero as the phase angle tends to zero, which means that at this point no possibility would exist for vibration damping.

Referring now to FIGS. 1, 2 and 3, it will be seen that the damping core according to the invention comprises an elastomer body member formed of a central ring or band 1 of planar pattern, to which the minor bases of two frusto-conical annular ridges 2 are connected, these ridges diverging from opposite sides relative to the central band 1. Said ridges 2 terminate at a respective smoothed zone 5 aiding in accomodating said core within the articulated joint housing 7, which housing may be of any shape and is connected to the articulated arms, the vibrations of which are to be dampened. Said core has a through hole 3 passing therethrough, in which an insert 6 (FIG. 4) is intended to be accomodated, the insert material being stiffer than that of the core elastomer, both said hole 3 and insert 6 being of cross-section other than circular.

Particularly, as more clearly shown in FIGS. 1 and 3, the core hole 3 has two central enlargements 4 therein, so that said hole 3 will take an eight-shaped configuration. Looking now at FIG. 4, the particular behaviour of a damping core according to the invention will be seen, which core under compression stress allows an increase in phase angle and causes a highly delayed force response relative to the displacement, that is to say a "braked" recovery.

Thus, by taking advantage of the geometry of the proposed articulated joint and elastomer deformability, it is obtained during a relative angular movement of insert 6 with respect to housing 7 that a portion of elastomer which is in the active zone (a) moves to the passive zone (b), thus developing such an elastomer swelling or bulging out as to provide a force (c) in the same direction of the compressive force (d). It is apparent that in recovery or return phase some force will be required to bring back to zone (a) that portion of elastomer transferred to (b) by the angular displacement of insert 6, thus providing a very high artificial displacement between imparted force and displacement.

Obviously, the invention is not restricted to the details herein shown and described in the simplest form thereof. Thus, it is apparent that if required, use could also be made of ring cores having differently shaped holes, and also a plurality of ring cores or, where space requirements exist, the two outer divergent ridges 2 may have juxtaposed thereto further extension annular elements and resort to similar expedients as time by time required by the articulated joint.

Therefore, any additions and/or modifications made on the ground of the present inventive concept would be within the scope of the invention.

What is claimed is:

1. A damping core for an articulated joint between first and second members, said core being adapted to be received in said first member and resisting relative rotational movement between the two members, said core comprising:
an elastomeric body which is elongated along an axis thereof, said body having a central opening for receiving said second member which opening is elongated along an axis thereof, the elongated axes of said body and opening being essentially coincident the width of said opening along said axis being greater at the ends of said elongated opening than at the middle of said elongated opening.

2. The core of claim 1 further including an elongated, hollow, relatively stiff insert member disposed in said central opening, said member having an at rest position in which the primary axis is disposed essentially coincident the said primary axes of said body and opening and damping positions at which the primary axis of said insert is disposed at an angle to the primary axis of said body.

3. The core of claim 2, wherein said body has a pair of ridges extending outwardly from said primary opening and defining an annular area therebetween and wherein said annular area is spaced at an essentially constant distance from said opening around the perimeter of said opening.

4. The core of claim 3, wherein said ridges have first surfaces which intersect said annular area at essentially a constant acute angle around the perimeter of said annular area.

5. The core of claim 4, wherein said ridges further have second surfaces which are spaced at essentially a constant distance from said opening around the perimeter of said opening.

6. A damping core for an articulated joint between two members, said core resisting relative rotational movement between the two members, said core comprising:
an elastomeric body which is elongated along an axis thereof, said body having a central opening which is elongated along an axis thereof, the elongated axes of said body and opening being essentially coincident the width of said opening along said axis being greater at the ends of said elongated opening than at the middle of said elongated opening, said body having a pair of ridges extending outwardly from said primary opening and defining an annular area therebetween, said annular area being spaced at an essentially constant distance from said opening around the perimeter of said opening.

7. The core of claim 6, wherein said ridges have first surfaces which intersect said annular area at essentially a constant acute angle around the perimeter of said annular area.

8. The core of claim 7, wherein said ridges further have second surfaces which are spaced at essentially a constant distance from said opening around the perimeter of said opening.

* * * * *